C. H. WATSON.

Improvement in Cultivators.

No. 128,686. Patented July 2, 1872.

UNITED STATES PATENT OFFICE.

CHARLES H. WATSON, OF WASHINGTON, DISTRICT OF COLUMBIA.

IMPROVEMENT IN CULTIVATORS.

Specification forming part of Letters Patent No. 128,686, dated July 2, 1872.

SPECIFICATION.

*To all whom it may concern:*

Be it known that I, CHAS. H. WATSON, of the city of Washington, District of Columbia, have invented a certain new and useful Standard, and attachments for the same, for Cultivators, Harrows, Plows, &c.; the object of which is to furnish a device so constructed that it will serve as a runner while moving the implement to and from the field, and will also furnish means for the attachment of a plow or shovel to be used in cultivation, which shall be simple in construction and efficient in operation; and it consists in the use of the device, the construction and combination of parts, as hereinafter more fully described and pointed out by the claims; and I do hereby declare that the following is a full, clear, and exact description of the same, which will enable others skilled in the art to which it appertains to make and use the same, reference being had to the accompanying drawing, with letters of reference marked thereon, forming a part of this specification, in which—

Figure 1:
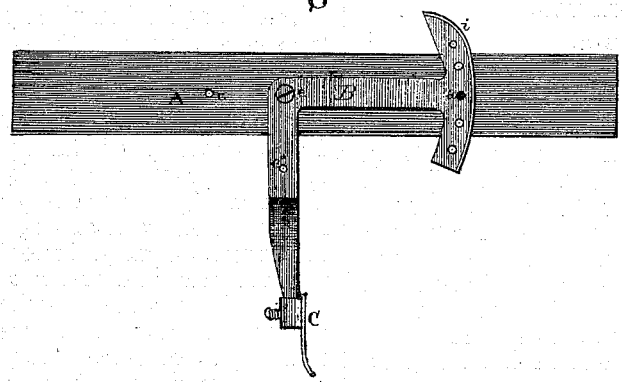
Figure 2:
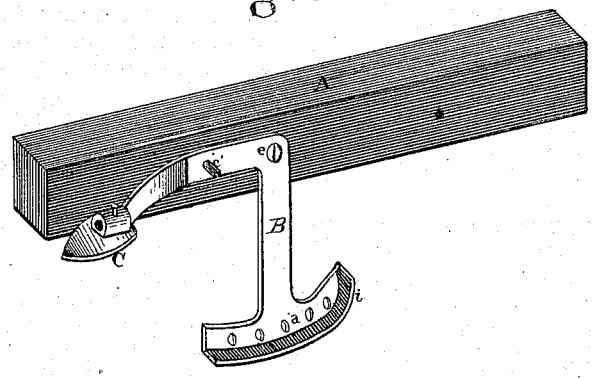

Figure 1 is a side elevation of a device embodying my invention; and Fig. 2 is a perspective view of the same, showing the standard reversed from the position shown in Fig. 1.

A in the drawing represents an ordinary drag-bar, cultivator-beam, or harrow-frame, having the standard B pivoted thereto at $e$, as shown. Said standard is provided on one end with a head, $a$, having perforations formed on the arc of a circle whose center is at the pivot $e$, allowing the inclination of that part of the standard carrying the shovel C to be adjusted, thereby causing the shovel to run deep or shallow, as desired. The head $a$ is also provided with a flange, $i$, to provide a broad surface to run upon the ground when used in position, as shown in Fig. 2. Between the pivot $e$ and shovel C the standard has a perforation, $c'$, and the beam or frame A has a corresponding perforation, $c$, to receive a pin to hold the standard in place, as shown in Fig. 2. C represents a shovel having a socket upon its back to receive the end of the standard B, said shovel being held in place by a set-screw, and the shovel may be adjusted to throw the dirt in or out, as desired. The standard B is shown as bent outward from the beam or frame, but it may be made in any other desired form. The standard may instantly be reversed from the position shown in Fig. 1 to the position shown in Fig. 2 by simply removing the pin from the head $a$, reversing the standard, and inserting the same pin in perforation $c'$ of standard and the perforation $c$ of the frame or beam. The pin used may be a wooden break-pin, so that when the device is used as a cultivator-plow or harrow the pin will break when the plow or shovel meets an unyielding obstruction, and thereby prevent the plow or shovel from being damaged.

It is obvious that a wheel may be arranged upon the standard B to take the place of the runner formed by the head $a$ and flange $i$, and also that a standard may be rigidly attached to the frame or beam, with a short sleeve or standard pivoted thereto, said short standard having a plow or shovel upon one end and a runner or wheel upon the other, without departing from the spirit of my invention.

When used upon harrows, the shovel C will be dispensed with, and that part of the standard carrying the shovel may be formed into any desired form of harrow-tooth. Then, by placing three of my improved teeth upon the angular harrow—one on each corner, or any required number upon other forms of harrow-frames—the implement may be moved to and from the field without the necessity of loading the same into a wagon, and, besides, the implement itself may support a load if required.

Having thus fully described my invention, what I claim, and desire to secure by Letters Patent, is—

1. A reversible cultivator or plow-standard, having a plow, or a cultivator, or harrow-tooth upon one end, and a suitable runner or device for running upon the ground upon the other end, substantially as and for the purpose set forth.

2. The standard B, provided with the head $a$ and flange $i$, as and for the purpose specified.

3. The standard B, having a suitable head, $a$, and flange $i$, in combination with the beam A, the standard being pivoted to the beam and held in place by a pin at $c'$, substantially as and for the purpose described.

4. The reversible standard B, when constructed substantially as specified, as and for the purpose set forth.

CHAS. H. WATSON.

Witnesses:
 H. S. ABBOT,
 F. A. LEHMANN.